(12) United States Patent
Xie et al.

(10) Patent No.: US 8,628,838 B2
(45) Date of Patent: *Jan. 14, 2014

(54) MULTILAYER THERMO-REVERSIBLE DRY ADHESIVES

(75) Inventors: Tao Xie, Troy, MI (US); Xingcheng Xiao, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 881 days.

This patent is subject to a terminal disclaimer.

(21) Appl. No.: 11/867,572

(22) Filed: Oct. 4, 2007

(65) Prior Publication Data

US 2008/0257486 A1 Oct. 23, 2008

Related U.S. Application Data

(60) Provisional application No. 60/925,418, filed on Apr. 20, 2007.

(51) Int. Cl.
*B32B 3/00* (2006.01)

(52) U.S. Cl.
USPC ........... 428/174; 428/354; 428/188; 428/617; 428/413; 428/423.1; 428/421; 428/457; 428/426; 156/711

(58) Field of Classification Search
USPC ................. 156/311, 247, 499, 230, 701–719; 428/413, 423.1, 421, 457, 426, 174, 428/354, 188, 617
See application file for complete search history.

(56) References Cited

U.S. PATENT DOCUMENTS

| | | | |
|---|---|---|---|
| 3,784,647 A | 1/1974 | Fleming et al. | |
| 4,552,933 A | 11/1985 | Sellstrom et al. | |
| 4,882,399 A | 11/1989 | Tesoro et al. | |
| 5,002,818 A * | 3/1991 | Licari et al. | 428/209 |
| 5,057,558 A | 10/1991 | Chung et al. | |
| 5,672,402 A * | 9/1997 | Kreckel et al. | 428/34.2 |
| 5,755,913 A | 5/1998 | Liaw et al. | |
| 5,916,008 A | 6/1999 | Wong | |
| 5,928,803 A * | 7/1999 | Yasuda | 374/101 |
| 5,969,006 A | 10/1999 | Onan et al. | |
| 6,156,842 A * | 12/2000 | Hoenig et al. | 525/171 |
| 6,589,892 B1 * | 7/2003 | Smith et al. | 442/414 |
| 6,627,037 B1 * | 9/2003 | Kurokawa et al. | 156/712 |
| 6,692,807 B2 * | 2/2004 | Bries et al. | 428/40.1 |
| 6,759,481 B2 | 7/2004 | Tong | |
| 6,773,535 B1 | 8/2004 | Wetzel | |
| 6,793,026 B1 | 9/2004 | De Fazio | |
| 6,827,325 B2 | 12/2004 | Hofmann et al. | |

(Continued)

FOREIGN PATENT DOCUMENTS

JP 05202334 A 8/1993
JP 2003073453 A 3/2003

OTHER PUBLICATIONS

Aubert et al., Thermally Removable Epoxy Adhesives Incorporating Thermally Reversible Diels-Alder Aducts, The Journal of Adhesion, 2003, vol. 79, pp. 609-616.*

(Continued)

*Primary Examiner* — Christopher Schatz
(74) *Attorney, Agent, or Firm* — BrooksGroup

(57) ABSTRACT

One embodiment includes a multilayer thermo-reversible dry adhesive system comprising of at least one layer of soft dry adhesive and one layer of shape memory polymer.

21 Claims, 4 Drawing Sheets

(56) References Cited

U.S. PATENT DOCUMENTS

| | | | |
|---|---|---|---|
| 6,986,855 B1 | 1/2006 | Hood et al. | |
| 7,188,498 B2 | 3/2007 | Browne et al. | |
| 7,762,362 B2 | 7/2010 | Cutkosky et al. | |
| 2001/0047579 A1 | 12/2001 | Lee et al. | |
| 2003/0060573 A1* | 3/2003 | Walter et al. | 525/452 |
| 2003/0150557 A1* | 8/2003 | Sezi et al. | 156/330.9 |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |
| 2006/0188706 A1* | 8/2006 | Kobayashi et al. | 428/317.1 |
| 2007/0023137 A1* | 2/2007 | Merz | 156/275.7 |
| 2007/0073130 A1 | 3/2007 | Finch et al. | |
| 2007/0289786 A1 | 12/2007 | Cutkosky et al. | |
| 2008/0027199 A1* | 1/2008 | Mazurek et al. | 528/10 |
| 2008/0269420 A1* | 10/2008 | Tong et al. | 525/208 |

OTHER PUBLICATIONS

PCT/US2008/060796 Written Opinion and Search Report; Mailed: Jun. 30, 2008; 8 pages.

PCT/US2008/060826 Written Opinion and Search Report; Mailed: Jun. 30, 2008; 9 pages.

About Foam: Foam Rubber Discount Center; Copyright 2005; 3 pages.

Daltorio et al., A Small Wall-Walking Robot with Compliant, Adhesive Feet; 2005 IEEE/RSJ international Conference on Intelligent Robots and Systems; pp. 4018-4023.

Unver et al., Geckobot: a gecko inspired climbing robot using elastomer adhesives (abstract); Robotics and Automation, 2006, ICRA 2006, Proceedings 2006 IEEE International Conference on; Published May 15-19, 2006; pp. 2329-2335.

EPON Resin 828; Shell Chemical-Online Literature; http://www2.shellchemical.com/CMM/WEB/GLOBCH...printed Oct. 10, 1999; 8 pages.

Lee et al., Handbook of Epoxy Resins; McGraw-Hill Book Company; 2 pages, 1967.

Bellin et al., Polymeric Triple-Shape Materials; PNAS; Nov. 28, 2006 vol. 103; No. 48; pp. 18043-18047.

Chung et al., Two-Way Reversible Shape Memory in a Semicrystalline Network; Macromolecules 2008, 41, pp. 184-192.

Dietsch et al., A Review—Features and Benefits of Shape Memory Polymers (SMPs); Cornerstone Research Group Inc., vol. 39, No. 2, Apr. 2007; pp. 3-11.

Gall et al., Shape Memory Polymer Nanocomposites; Acta Materialia 50 (2002) pp. 5115-5126.

Gall et al., Internal Stress Storage in Shape Memory Polymer Nanocomposites; Applied Physics Letters; vol. 85, No. 2; Jul. 12, 2004; pp. 290-292.

Goethals et al., Poly(Vinyl Ethers) as Building Blocks for New Materials; Macromol. Symp. 132, (1998), pp. 57-64.

Huang et al., Water-Driven Programmable Polyurethane Shape Memory Polymer: Demonstration and Mechanism; Applied Physics Letters; 86, (2005) 114105-1-3.

Jeffamine D-230; Huntsman Technical Bulletin; Copyright 2006; 2 pages.

Jiang et al., Polymers Move in Response to Light; Adv. Mater. 2006, 18, pp. 1471-1475.

Lee et al., Structure and Thermomechanical Properties of Polyurethane Block Copolymers with Shape Memory Effect; Macromolecules; 2001; 34, pp. 6431-6437.

Lee et al., A Reversible Wet/Dry Adhesive Inspired by Mussels and Geckos; Nature; vol. 448; Jul. 19, 2007; pp. 338-342.

Lee et al., Single-Molecule Mechanics of Mussel Adhesion; PNAS; Aug. 29, 2006; vol. 103; pp. 12999-13003.

Lendlein et al., Shape-Memory Polymers; Angew. Chem. Int. Ed., 2002, 41, pp. 2034-2057.

Lendlein et al., Light-Induced Shape-Memory Polymers; Nature; vol. 434, Apr. 14, 2005; pp. 879-882.

Lendlein et al., Biodegradable, Elastic Shape-Memory Polymers for Potential Biomedical Applications; Science, vol. 296, May 31, 2002, pp. 1673-1676.

Li et al., Shape Memory Effect of Ethylene-Vinyl Acetate Copolymers; Journal of Applied Polymer Science, vol. 71, 1063-1070 (1999), pp. 1063-1070.

Lin et al., Study on Shape-Memory Behavior of Polyether-Based Polyurethanes. I. Influence of the Hard-Segment Content; Journal of Applied Polymer Science, vol. 69, (1998), pp. 1563-1574.

Lin et al., Study on Shape-Memory Behavior of Polyether-Based Polyurethanes. II. Influence of Soft-Segment Molecular Weight; Journal of Applied Polymer Science, vol. 69, (1998), pp. 1575-1586.

Liu et al., Review of Progress in Shape-Memory Polymers; J. Mater. Chem., 2007, 17, pp. 1543-1558.

Behl et al., Shape-Memory Polymers: Dual Shape Materials for Bio-Medical Applications; Center for Biomaterial Development, Institute of Polymer Research, GKSS Research Center Geesthact, Kantstr. 55, D-14513 Teltow, Germany, 20 pages.

Liu et al., Novel Shape-Memory Polymer with Two Transition Temperatures; Macromol. Rapid Commun. 2005; 26, pp. 649-652.

Liu et al., Chemically Cross-Linked Polycyclooctene: Synthesis, Characterization and Shape Memory Behavior; Macromolecules 2002, 35, pp. 9868-9874.

Nelson et al., Shape Recovery of Nanoscale Imprints in a Thermoset "shape memory" Polymer; Applied Physics Letters; 86, (2005) pp. 103108-1-3.

Crystallization of Liquid DGEBPA and DGEBPF Epoxy Resins; Resolution Performance Products Product Bulletin; Copyright 2007; 3 pages.

Reyntjens et al., Polymer Networks Containing Crystallizable Poly(octadecyl vinyl ether) Segments for Shape-Memory Materials; Macromol. Rapid Commun., 20, (1999), pp. 251-255.

Rousseau et al., Shape Memory Effect Exhibited by Smectic-C Liquid Crystalline Elastomers; J. Am. Chem. Soc. 2003, 125, pp. 15300-15301.

Shape Memory Polymer; CRG Technology Success Stories; http://www.crgrp.net/success-stories.shtml; printed Aug. 14, 2007; 4 pages.

TEMBO Shape Memory Polymers and Elastic Memory Composite; Composite Technology Development, Inc.; http://www.ctd-materials.com/products/emc.htm; printed Aug. 14, 2007; 3 pages.

Veriflex Shape Memory Polymer; CRG Technology; http://www.crgrp.net/veriflex.shtml; printed Aug. 14, 2007; 2 pages.

Xie et al., Self-Peeling Reversible Dry Adhesive System; Chem. Mater. 2008, 20, pp. 2866-2868.

Xu et al., Synthesis and Shape Memory Effects of Si-O-Si Cross-Linked Hybrid Polyurethanes; Polymer 47, (2006), pp. 457-465.

U.S. Appl. No. 11/876,531; Title: Reversible Dry Adhesives; Inventor: Tao Xie; Filed: Oct. 4, 2007.

U.S. Appl. No. 11/867,549; Title: Method of Minimizing Residue Adhesion for Thermo-Reversible Dry Adhesives; Inventor: Tao Xoe; Filed: Oct. 4, 2007.

U.S. Appl. No. 11/867,558; Title: Multilayer Adhesive for Thermal Reversible Joining of Substrates; Inventor: Tao Xie; Filed: Oct. 4, 2007.

U.S. Appl. No. 11/867,588; Title: Shape Memory Epoxy Polymers; Inventor: Tao Xie; Filed: Oct. 4, 2007.

U.S. Appl. No. 12/105,749; Title: Method for Robotic Handling Using Thermo-Reversible Dry Adhesives; Inventor: Tao Xie; Filed: Apr. 18, 2008.

U.S. Appl. No. 12/105,788; Title: Climbing Devices Based on Thermo-Reversible Dry Adhesives; Inventor: Tao Xie; Filed: Apr. 18, 2008.

U.S. Appl. No. 12/105,865; Title: Attachment Pad with Thermal Reversible Adhesive and Method of Making and Using the Same; Inventor: Tao Xie; Filed: Apr. 18, 2008.

U.S. Appl. No. 12/178,844; Title: Hook Side Chain First Shape Memory Polymer and Loop Side Chain Second Shape Memory Polymer; Inventor: Tao Xie; Filed: Jul. 24, 2008.

U.S. Appl. No. 12/181,562; Title: Polymer Systems with Multiple Shape Memory Effect; Inventor: Tao Xie; Filed: Jul. 29, 2008.

(56) References Cited

OTHER PUBLICATIONS

U.S. Appl. No. 12/273,083; Title: Self-Healing and Scratch Resistant Shape Memory Polymer System; Inventor: Xingcheng Xiao; Filed: Nov. 18, 2008.

U.S. Appl. No. 12/359,709; Title: Remote Activation of Thermo-Reversible Dry Adhesives; Inventor: Yang T. Cheng; Filed: Jan. 26, 2009.

U.S. Appl. No. 12/367,826; Title: Reversible Welding Process for Polymers; Inventor: Tao Xie; Filed: Feb. 9, 2009.

U.S. Appl. No. 12/391,704; Title: Reversible Dry Adhesives for Wet and Dry Conditions; Inventor: Tao Xie; Filed: Feb. 24, 2009.

U.S. Appl. No. 12/396,045; Title: Polymer Systems with Multiple Shape Memory Effect; Inventor: Tao Xie; Filed: Mar. 2, 2009.

U.S. Appl. No. 12/423,947; Title: Shape Memory Polymer and Adhesive Combination and Methods of Making and Using the Same; Inventor: Tao Xie; Filed: Apr. 15, 2009.

U.S. Appl. No. 12/432,211; Title: Shape Memory Polymers with Surface Having Dangling Adhesive Polymeric Chains and Methods of Making and Using the Same; Inventor: Tao Xie; Filed: Apr. 29, 2009.

* cited by examiner

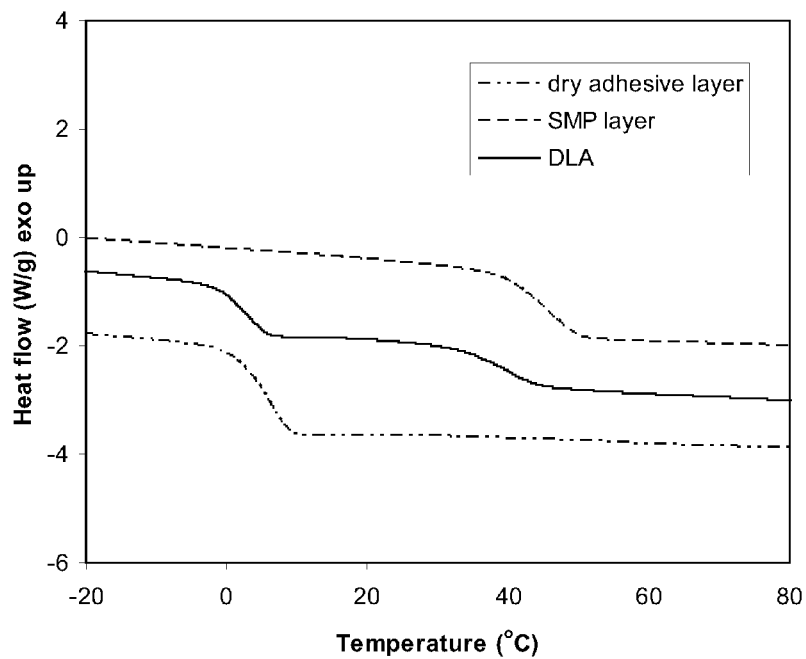
FIG. 4
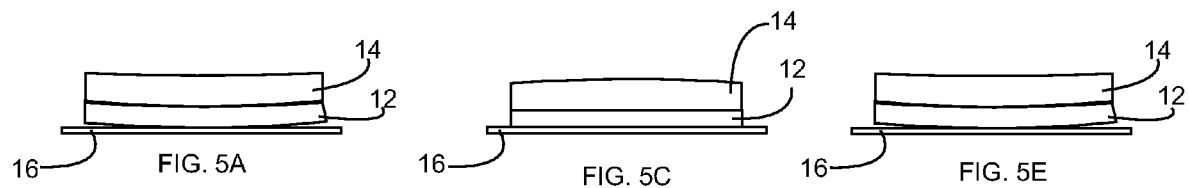
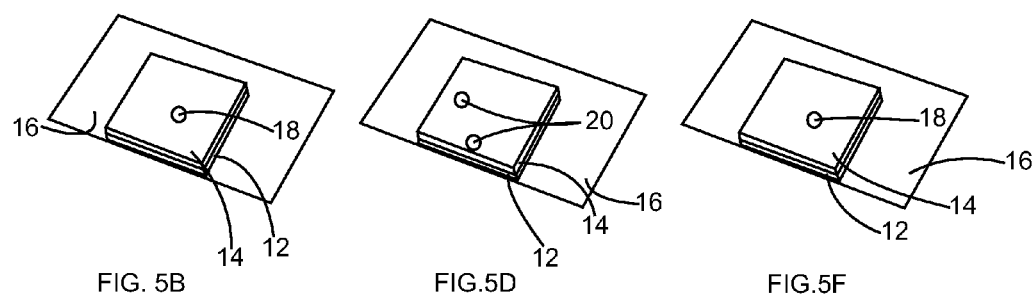
FIG. 5B   FIG. 5D   FIG. 5F

MULTILAYER THERMO-REVERSIBLE DRY ADHESIVES

This application claims the benefit of U.S. Provisional Application No. 60/925,418, filed Apr. 20, 2007.

FIELD OF THE INVENTION

The field to which the disclosure generally relates includes compositions of thermo-reversible dry adhesive systems.

BACKGROUND

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 N/cm². When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 N/cm²), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off force of 3 and 10 N/cm² towards glass. Both adhesives suffer from severe adhesion loss after only one or two attaching/detaching cycles, as a result of breakdown or the lateral collapse of the nano structures, with the latter referring adjacent nano-hairs bonding to each other In addition, synthetic Gecko adhesives are expensive to produce and large-scale manufacturing is practically too difficult.

SUMMARY OF EXEMPLARY EMBODIMENTS OF THE INVENTION

One embodiment of the invention includes a composition of a multilayer thermo-reversible dry adhesive comprising at least one layer of soft dry adhesive and one layer of shape memory polymer.

Another embodiment of the invention includes a method comprising heating a multilayer thermo-reversible dry adhesive having a curved structure at room temperature and applying a load to the adhesive when it is heated above the glass transition temperature of the shape memory polymer layer and cooled down under the load so that the adhesive adheres to an underlying substrate so that the adhered adhesive has a pull-off strength greater than 10 N/cm² on the stainless steel alloy 304 (SS304) substrate, and thereafter detaching the adhesive comprising heating the adhesive to a temperature above the glass transition temperature of the shape memory polymer layer to cause the adhesive to return to a curved structure.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 4 illustrates differential scanning calorimetry curves for the dry adhesive layer, the shape memory polymer layer, and the double layer adhesive.

FIG. 5A illustrates a double layer adhesive according to one embodiment of the invention.

FIG. 5B illustrates a double layer adhesive according to one embodiment of the invention.

FIG. 5C illustrates a double layer adhesive according to one embodiment of the invention.

FIG. 5D and FIG. 5E illustrate a double layer adhesive according to one embodiment of the invention.

FIG. 5F illustrates a double layer adhesive according to one embodiment of the invention.

DETAILED DESCRIPTION OF EXEMPLARY EMBODIMENTS

Figure 1:
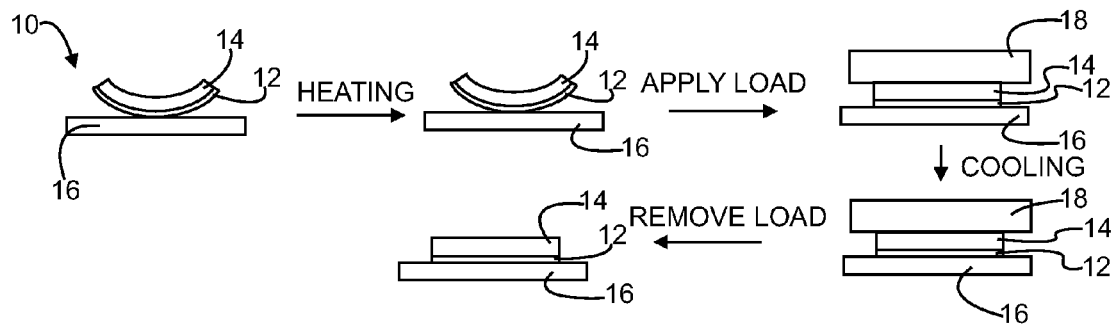
FIG. 1 illustrates a double layer adhesive after heating and applying a load, and after cooling and removing the load.

The following description of the embodiment(s) is merely exemplary in nature and is in no way intended to limit the invention, its application, or uses.

One embodiment of the invention includes a self-curved double layer adhesive (DLA) consisting of a soft dry adhesive layer and a shape memory polymer (SMP) layer, wherein the DLA exhibits a thermo-reversible adhesive behavior.

One embodiment of the invention includes a multilayer thermo-reversible dry adhesive having a first layer made from an aromatic diepoxide (rigid epoxy), an aliphatic diepoxy (short flexible epoxy), and a diamine curing agent, and a second layer made from an aliphatic diepoxy and a diamine curing agent. In one embodiment, the first layer is a shape memory polymer. The second layer is a soft dry adhesive. In one embodiment, the shape memory polymer layer may have a glass transition temperature $T_g$ ranging from 30 to 200° C. and the dry adhesive may have a $T_g$ ranging from −90 to 25° C. In another embodiment, the dry adhesive may have a $T_g$ ranging from −90° C. to 200° C. In one embodiment, the DLA may have a pull-off adhesive strength greater than 1 N/cm², for example, ranging from 10 to 200 N/cm², towards an SS304 substrate. With respect to the pull-off strength, the invention is not limited to a pull-off strength from a SS304 substrate. Various substrates may be used to achieve a pull-off strength of 1-200 N/cm². In one embodiment the multilayer thermo-reversible dry adhesive has a curved structure.

Another embodiment of the invention includes a method comprising heating a multilayer thermo-reversible dry adhesive having a curved structure at room temperature and applying a load to the adhesive when it is heated above the glass transition temperature of the shape memory polymer layer and cooled down under the load so that the adhesive adheres to an underlying substrate so that the adhered adhesive has a pull-off force greater than 10 N/cm² on the SS304 substrate, and thereafter detaching the adhesive comprising heating the adhesive to a temperature above the glass transition temperature of the shape memory polymer layer to cause the adhesive to return to a curved structure.

One embodiment of the invention includes a method of making a multilayer thermo-reversible dry adhesive comprising a shape memory polymer layer and a soft dry adhesive layer. In one embodiment, the shape memory polymer layer is made as follows. The first step includes heating 3.6 g of EPON 826 (the diglycidyl ether of bisphenol A epoxy monomer) to about 75° C. and mixing the same with 2.16 g of NGDE (neopentyl glycol diglycidyl ether) and 2.3 g of a diamine Jeffamine D-230, wherein Jeffamine D-230 is the curing agent poly(propylene glycol)bis(2-aminopropyl) ether. EPON 826 and Jeffamine D-230 may be obtained from Hexion and Huntsman, respectively. Neopentyl glycol diglycidyl ether (NGDE) may be obtained from TCI America. The mixture was then poured into an aluminum pan and cured in an oven at about 100° C. for 1.5 hours. In one embodiment, the aluminum pan may be circular in shape. In one embodiment, the mixture may be post-cured at 130° C. for 1 hour. The first cured epoxy layer may be known as a shape memory polymer (SMP) layer.

Then a mixture of 2.16 g of NGDE and 1.15 g of a diamine Jeffamine D-230 was poured into the aluminum pan on top of the first cured epoxy layer (the shape memory polymer layer) and cured for 1.5 hours at 100° C. Then the oven temperature was raised to 130° C. for post-curing for about 1 hour. At the end of the post-curing, the cured two-layer epoxy was demolded and cut into small pieces of about 1 cm×1 cm and the exact dimensions were measured. A double layer epoxy was obtained including a first shape memory polymer layer with a glass transition temperature of about 40° C., and a second soft dry adhesive layer. The thickness of the first layer was about 2 mm. The thickness of the second layer was about 1 mm. The double layer epoxy obtained may be known as a double layer adhesive (DLA). In one embodiment, the DLA samples were heated to 90° C. for 5 minutes and allowed to cool down to room temperature prior to their use.

The yielded double layer epoxy structure had a slightly curved structure due to the thermal mismatch between the first and second layers. The curved structure is advantageous in providing a reversibility of the adhesion. This curved structure can also be created by specifically designed molds.

In one embodiment, a method of forming an adhesive bond is provided. Referring now to FIG. 1, a curved DLA 10 (comprising a dry adhesive layer 12 and an SMP layer 14) was placed on a substrate 16, for example a stainless steel (SS304) substrate, and heated to a temperature higher than the glass transition temperature ($T_g$) of the shape memory polymer layer with the dry adhesive layer 12 facing down on the substrate. In one embodiment, the DLA 10 was heated inside a 90° C. oven. After about 10 minutes of heating, the DLA 10 and the substrate 16 were removed from the oven and a load 18 of about 4 N was imposed immediately on the upper SMP layer 14. With the load on, the DLA was allowed to cool to a temperature below the $T_g$ of the shape memory polymer layer.

In one embodiment, the DLA was allowed to cool under ambient conditions for about 10 minutes. Thereafter, the load was removed and the bonded sample (DLA on SS304) was subjected to an adhesion test.

Figure 2:
FIG. 2 illustrates an adhesion test to measure the pull-off force of a double layer adhesive.

A method of measuring the pull-off force is shown in FIG. 2. The bonded DLA sample was separated from the SS304 substrate with a pull-off force normal to the substrate. The maximum pull-off force at the point of separation was measured by a load cell. In one embodiment, this maximum pull-off strength was about 60 N/cm². Unless otherwise noted, the pull-off strength was calculated by the maximum separation force divided by the DLA surface area.

In one embodiment, one bonded sample was heated in a 90° C. oven for about 10 minutes with no load. Immediately after the sample was taken out of the oven, the bonding separation was conducted in a peel-off mode and the peel-off force measured was less than 1 N/cm.

Figure 3:
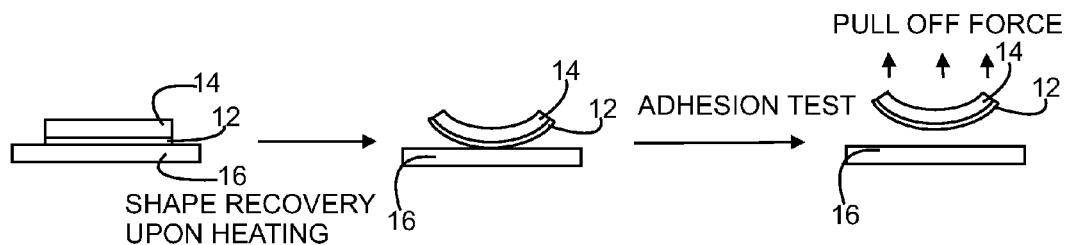
FIG. 3 illustrates an adhesion test to measure the pull-off force of a double layer adhesive.

Another embodiment includes a method of measuring the pull-off force to test the thermo-reversibility of the adhesion, as shown in FIG. 3. The bonded sample was heated with no load to a temperature higher than the $T_g$ of the shape memory polymer layer. In one embodiment, the bonded sample was heated in a 90° C. oven for about 10 minutes with no load. After the heating, the restoration of the curve was observed as a result of the shape memory property of the SMP layer. The sample, after cooling down to ambient temperature under no load, was submitted to an adhesion test and the pull-off strength measured was about 6 N/cm². Overall, the dry adhesive layer and the shape memory polymer layer determine the adhesive strength and thermo-reversibility, respectively.

Thus according to one embodiment of the invention a curved structure was provided consisting of a dry adhesive layer and a layer of shape memory polymer. By heating to a temperature higher than the glass transition temperature ($T_g$) of the shape memory polymer, and imposing a load while cooling to a temperature below the $T_g$, the double layer structure formed a strong adhesive bond with a stainless steel substrate with a pull-off force of about 60 N/cm². The strong bond may be automatically released by heating the structure to a temperature above the $T_g$ of the shape memory polymer to restore the curvature.

In one embodiment, the substrate 16 may be flat and the DLA 10 may be curved. In another embodiment, the first substrate 16 may be curved and the DLA 10 may be flat.

In one embodiment, a DLA comprising the SMP layer and the dry adhesive layer was prepared according to the method described above. Differential scanning calorimetry (DSC) measurements were made under nitrogen using a DSC Q1000 (TA instruments) at a heating rate of 10° C.·min$^{-1}$. FIG. 4 shows the DSC curves for the SMP layer, the dry adhesive layer, and the DLA. Referring to FIG. 4, the DSC curve for the DLA shows two distinctive glass transitions at 39.9° C. and 3.0° C. These two glass transition temperatures are in line with the $T_g$'s measured for the SMP layer and the dry adhesive layer cured separately, as shown in FIG. 4. No exothermal peaks were observed in any of the three DSC curves in FIG. 4, indicating completion of the cure in all three cases.

Qualitatively, the epoxy layer with a $T_g$ lower than room temperature may be sticky towards many substrate surfaces such as glass and is thus a soft dry adhesive. The epoxy with a $T_g$ higher than room temperature is rigid and non-sticky at room temperature. The epoxy layer with a $T_g$ of 39.9° C. is expected to exhibit shape memory properties above room temperature.

In one embodiment, the adhesion reversal process was observed for a DLA sample with dimensions of 1.03 cm by 1.02 cm by 0.21 cm, prepared according to the method described above. FIGS. 5A and 5B show the side and top view, respectively, of the as-prepared DLA sample positioned on an SS304 substrate 16 (macroscopically flat with an $R_a$ of 73 μm). FIG. 5A shows the side view of the DLA, including the dry adhesive layer 12 and the SMP layer 14. In one embodiment, the dry adhesive layer has a thickness of 0.07 cm and the SMP layer has a thickness of 0.14 cm. A closer examination of FIGS. 5A and 5B reveals that the DLA has a slight curvature, which may originate from the thermal mismatch between the two epoxy layers. As shown in FIGS. 5A and 5B, in one embodiment the DLA had poor contact with the substrate surface, which may be caused by the curvature of the DLA and the rigid nature of the SMP layer at room temperature. FIG. 5B shows a contact spot 18 of the DLA with the SS304 substrate surface. Without heating, a preload of 4 N/cm$^2$ was imposed on the DLA positioned on top of the SS304 surface with the dry adhesive layer facing down. After the removal of the load, pull-off strength of 9.0 N/cm$^2$ was measured.

To improve the surface contact between the DLA and the stainless steel substrate, preheating of DLA at 90° C. (about 50° C. above the $T_g$ of the SMP layer) was employed during the formation of the adhesive bonding, as described above. In one embodiment, the DLA deformed immediately when the preload (4 N/cm$^2$) was imposed. After the subsequent cooling, the preload was removed and the deformed shape of DLA was maintained (FIG. 5C). The DLA deformation ensured that it complied with the stainless steel substrate. As a result, very good contact between the dry adhesive and the substrate was achieved at a macroscopic scale (FIGS. 5C and 5D). FIGS. 5C and 5D show the side and top view, respectively, of the bonded sample with maximum surface contact. Two small non-contact spots 20 were observed in FIG. 5D, which may be attributed to the unevenness of the load distribution. The pull-off strength measured for the bonded sample was 61.5 N/cm$^2$.

The adhesive bonding procedure was repeated and the bonded sample, instead of being separated by a pull-off force, was heated to 90° C. with no load except its own weight (0.26 g or 0.0026 N). FIGS. 5E and 5F show the side and top view, respectively, of the thermal recovered sample. After the heating, it was observed that the DLA returned to its original curved structure (FIG. 5E) and the contact area became small (FIG. 5F). After the heating and recovery of the curvature, the sample was taken out of the oven and the remaining small adhesive contact area was immediately separated by peeling. The recorded peel-off force was less than 0.1 N, which is a much smaller force than the pull-off force of 61.5 N. In one embodiment, the shape recovered sample was allowed to cool down to 25° C. and the DLA became rigid. Although peeling was no longer possible, the separation could still be done in a pull-off mode. This led to pull-off strength of 6.3 N/cm$^2$, which was about 10 times lower than the pull-off strength of 61.5 N/cm$^2$ measured without the thermal treatment at 90° C. This shows that the adhesion was reversed via heating.

For a reversible dry adhesive, a minimum preload is required to achieve maximum contact between the dry adhesive and a substrate, and therefore to achieve a maximum pull-off force. To establish such a criterion for minimum preload, a DLA sample was bonded to SS304 under a range of preloads and the corresponding maximum separating forces were recorded.

Figure 6:
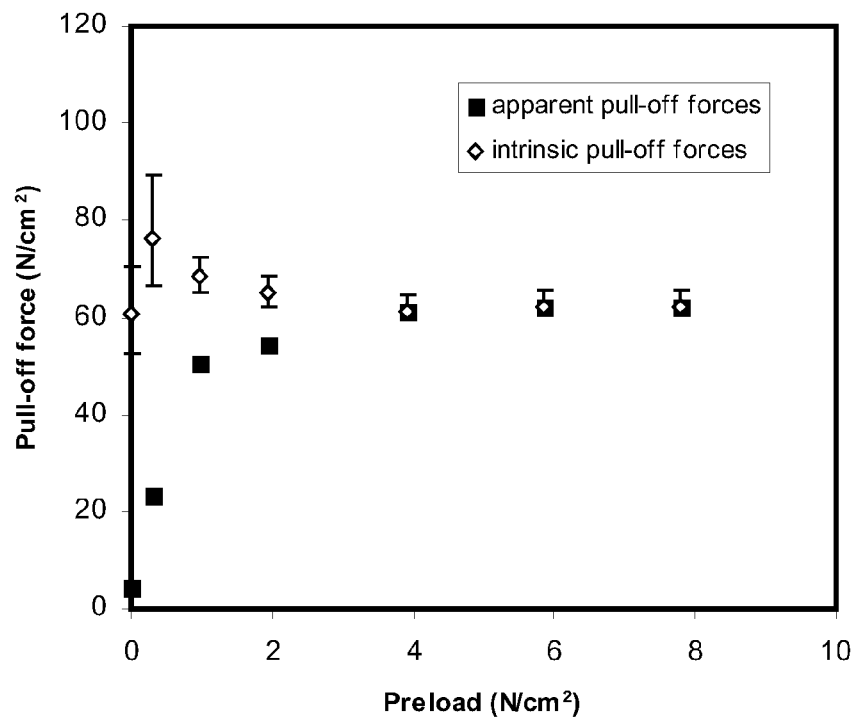
FIG. 6 illustrates the apparent and intrinsic pull-off forces of a double layer adhesive.

As noted above, the pull-off strength was obtained by dividing the separation force by the overall DLA surface area. This represents the apparent pull-off strength. FIG. 6 shows the impact of the preloads on the pull-off forces where the substrate is SS304, Ra=73 μm. As shown in FIG. 6, the apparent pull-off strength increased with the preloads (N/cm$^2$) until it reached a plateau at a preload of about 4 N/cm$^2$. Also shown in FIG. 6 is the intrinsic pull-off strength, which is the pull-off strength calculated after the actual macroscopic contact areas were estimated. The intrinsic pull-off strength based on such a definition is plotted in FIG. 6, with the error bars reflecting the difficulty in accurately estimating the actual contact areas particularly when preloads were small. Unlike the trend observed for the apparent pull-off strength, the intrinsic pull-off strength remains constant within the preload range.

Figure 7:
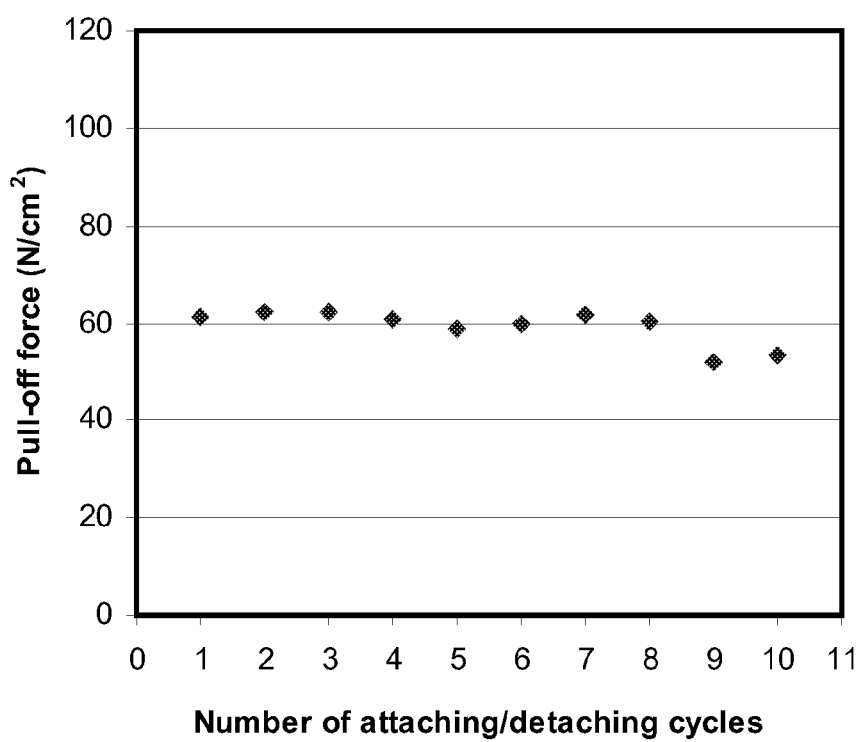
FIG. 7 illustrates the pull-off force of a double layer adhesive versus number of attaching/detaching cycles.

The durability of the DLA may be investigated by repeated attaching-detaching cycles with preloads sufficient to make maximum surface contacts. The pull-off strength measured after each attaching/detaching cycle from the stainless steel substrate (SS304, $R_a$=73 μm) is shown in FIG. 7. Data in this figure show no reduction in the pull-off strength on the first eight cycles. On the ninth and tenth cycles, a slight drop in pull-off strength (roughly 10%) was measured, accompanied by the appearance of some surface defect on the dry adhesive surface. The detachment of the adhesive bonds during the durability tests was conducted without adhesion being reversed thermally. In another embodiment, the adhesive bond may be detached via the thermal adhesion reversal mechanism, which is far less harsh than the detachment method used in the above durability tests. Nevertheless, even under the harsh detachment condition used in the cycling tests, the DLA shows very good durability, in sharp contrast to the typical poor durability of synthetic gecko adhesives.

Figure 8:
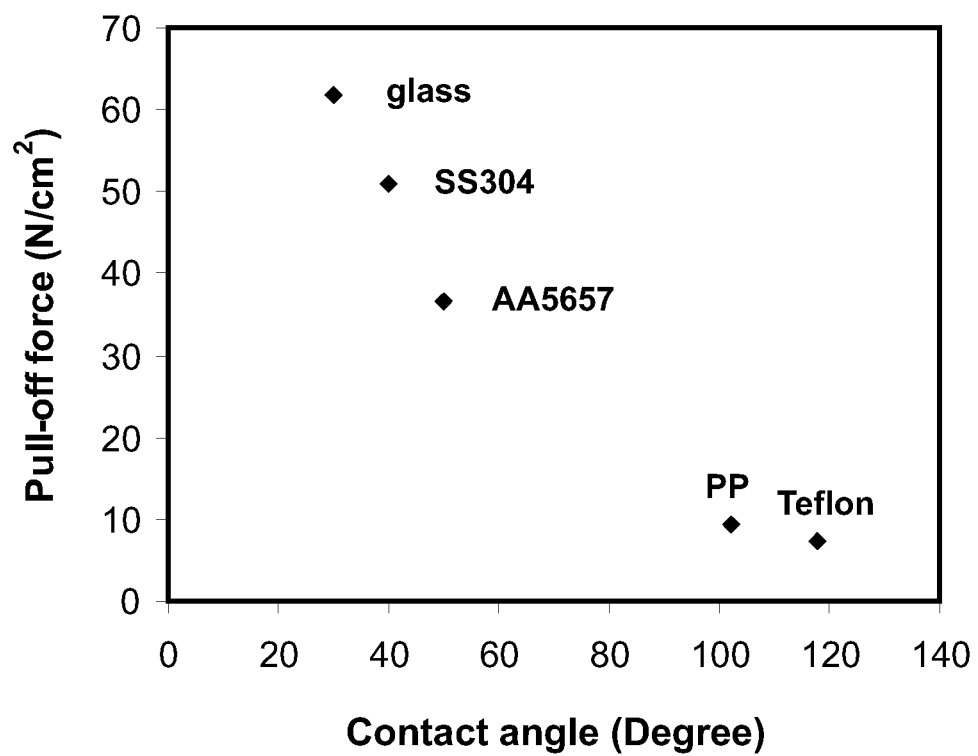
FIG. 8 illustrates the pull-off force of a double layer adhesive versus contact angle on different surfaces.

One of the major attributes of a gecko footpad is its ability to bond to a wide variety of substrates. In one embodiment, the adhesion of the DLA was examined towards a range of substrates, including an inorganic substrate (glass), metals (SS304 and aluminum alloy 5657), and hydrophobic polymers (polypropylene and Teflon). The pull-off strength measured is: glass (61.9 N/cm$^2$)>SS304 (51.0 N/cm$^2$)>aluminum alloy 5657 (36.6 N/cm$^2$)>>polypropylene (9.3 N/cm$^2$)>Teflon (7.3 N/cm$^2$). Referring to FIG. 8, the pull-off strength towards these surfaces is plotted against their water contact angles, showing that the pull-off strength decreases with the substrate surface hydrophobicity.

The essence of the gecko adhesion phenomenon is about making and controlling contact. For synthetic gecko adhesives made of rigid materials, maximizing contact may be a difficult task, as evidenced by the unusually high preloads required to achieve adhesion. One embodiment provides the combination of a soft dry adhesive with an SMP to create the DLA. Due to the SMP layer, the DLA can deform and adapt to the profile of a counter surface upon heating. The SMP layer further allows the deformed shape to be maintained after cooling (shown in FIGS. 5C and 5D). As a result, a macroscopically near perfect contact with the counter surface was achieved, which led to the pull-off strength of about 60 N/cm$^2$ measured against the SS304 substrate. The SMP layer is only responsible for maximizing the contact, while the intrinsic adhesion is provided by the dry adhesive layer. This pull-off strength of 60 N/cm$^2$ is 6-20 times higher than those reported for natural and synthetic gecko adhesives. Additionally, the maximum pull-off strength of 60 N/cm$^2$ was achieved with a minimum preload of 4 N/cm$^2$. This minimum preload requirement is about 1-2 orders of magnitude lower than the reported examples of synthetic gecko adhesives (50 N/cm$^2$ and ~300 N/cm$^2$, respectively), and is more in line with the low preload requirement for natural geckos.

Such a desirable attribute in principle arises from the low moduli of the two epoxy layers at a temperature above their $T_g$'s. The constant intrinsic pull-off strength in the whole preload range (shown in FIG. 6), on the other hand, implies that the function of the preloads is to deform the SMP and that no additional preload is required for the dry adhesive layer to adapt to the profile of the substrate surface. Again, such a behavior is attributed to the elastic nature (low modulus at room temperature) of the dry adhesive layer.

The adhesion reversal for the DLA is accomplished via heating, unlike natural and synthetic gecko adhesives. In one embodiment, the shape recovery of the DLA (thus adhesion reversal) upon heating can occur despite the large pull-off strength measured between the DLA and SS304 substrate. The original curvature plays a critical role here. During the shape recovery process to return to the original curvature, the interfacial separation started from the edge and gradually propagated to the center. In a way, this was a peeling process or more precisely a self-peeling process, as no external peeling force was involved. In this case, neither the large pull-off strength nor the magnitude of the recovery force of the SMP was relevant. Indeed, since the SMP was soft at a temperature above its $T_g$, the softness of the DLA in principle would have allowed the separation to occur in a peel-off mode.

The thermal reversibility of the adhesion for the DLA has important implications. A natural gecko controls its adhesion and the reversal process through its mechanical toe actions. A synthetic gecko adhesive at its best mimics only a gecko footpad, not the mechanical toe actions. For a synthetic gecko adhesive, when good adhesion is needed, accidental peeling should be avoided in which case a rigid backing layer may be desirable in principle. The rigid backing layer, however, would not allow peeling actions needed for the adhesion reversal/detachment. Indeed, the inability to reverse the adhesion for a synthetic dry adhesive with a rigid backing layer was reported. Unless a mechanical device is introduced to mimic mechanical gecko toe actions, the above paradox is difficult to avoid.

On the one hand, the SMP of one embodiment is rigid below its glass transition and the rigidity inhibits unwanted peeling to ensure good adhesion. On the other hand, the SMP becomes flexible at temperatures above its $T_g$, allowing peeling for adhesion reversal. Even when the SMP is cooled down to a temperature below its $T_g$ after its shape recovery, the curvature results in a 10 times drop in the pull-off strength. Thus, the controllability of the DLA adhesion is two fold: 1) the thermal transition of the SMP from being rigid to flexible turns the ability to peel on and off, in this case, the curvature is not required; and 2) the shape recovery ability and the original curved structure create a self-peeling mechanism to control the contact area, thus the adhesion. The DLA curvature originating naturally from the thermal mismatch allows the second controlling mechanism to occur. Curvatures created by purposeful mold design may have the same effect. For the DLA overall, the dry adhesive layer functions more like a gecko footpad, while the SMP layer resembles a gecko toe in terms of the mechanical function to control adhesion. This general approach of using an SMP to control the adhesion and adhesion reversal may be applied to any other dry adhesives. The adhesion reversal triggering temperature may be adjustable based on the $T_g$ of the SMP selected.

In one embodiment, the adhesion durability of the DLA may be far superior to typical synthetic adhesives because the DLA does not have a nano-hair structure. The poor durability of reported synthetic gecko adhesives is due to the breakdown and/or the lateral collapse (bunching) of the nano-hairs.

Some embodiments refer to a multilayer epoxy dry adhesive. It should be understood that more than two layers may be utilized. For example, there may be two or more layers of the shape memory polymer layer, which may be in a side by side relationship or an overlying relationship. Likewise, there may be two or more dry adhesive layers in a side by side relationship or an overlying relationship. As such, a device with custom or tailored properties may be manufactured.

In various embodiments of the invention, any combination of a shape memory polymer and a dry adhesive may be utilized. The following examples of shape memory polymers and dry adhesives are for illustrative purposes only.

In various embodiments, the components of a dry adhesive or the components of a shape memory polymer may include a rigid epoxy and a flexible epoxy. The range of possible crosslinking chemistries which may be used to achieve a dry adhesive or shape memory polymer may include alpha, omega-diaminoalkanes, anhydride, or catalytic (as in imidazole type) crosslinking reactions. There are many different ways to achieve the appropriate relationships between the molecular properties. For example, the dry adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. The components of the dry adhesive may be present in an amount sufficient to provide, upon curing of the composition, a dry adhesive having a glass transition temperature of −90° C. to 200° C. and having a pull-off strength of 1-200 N/cm² from a substrate. In one embodiment, the components of the shape memory polymer composition may be present in an amount sufficient to provide, upon curing of the composition, an epoxy shape memory polymer having a change in storage modulus of 2 to 3 orders of magnitude before and after its glass transition.

The above description of embodiments of the invention is merely exemplary in nature and, thus, variations thereof are not to be regarded as a departure from the spirit and scope of the invention.

What is claimed is:

1. A product comprising:
a multilayer thermo-reversible dry adhesive comprising:
a first layer comprising a soft dry adhesive configured to contact and adhere to a counter surface of a substrate;
a second layer comprising a shape memory polymer constructed and arranged to change the shape of the thermo-reversible dry adhesive;
wherein the multilayer thermo-reversible dry adhesive forms a first shape to allow sufficient contact with the counter surface for adhesive bonding to the substrate at a first temperature after a preload is applied to the thermo-reversible dry adhesive, and said multi-layer thermo-reversible dry adhesive is constructed and arranged to cause and to produce a memorized second curved shape to reduced adhesion to said counter surface at a second temperature without a load applied.

2. A product as set forth in claim 1 wherein the shape memory polymer comprises a product of a reaction mixture comprising:
- at least one of a rigid epoxy or a flexible epoxy; and
- at least one of a crosslinking agent or a catalytic curing agent;
- wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

3. A product as set forth in claim 1 wherein the soft dry adhesive comprises a product of a reaction mixture comprising:
- at least one of a rigid epoxy or a flexible epoxy; and
- at least one of a crosslinking agent or a catalytic curing agent;
- wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

4. A product as set forth in claim 1 further comprising a substrate wherein the multilayer thermo-reversible dry adhesive is positioned on top of the substrate with the first layer in contact with the substrate.

5. A product as set forth in claim 4 wherein said first shape is a relatively flat structure, said second shape is a relatively curved structure and the pull-off force of the multilayer thermo-reversible dry adhesive from the substrate with the curved structure is about 0 to 50 $N/cm^2$.

6. A product as set forth in claim 5 wherein the pull-off force of the multilayer thermo-reversible dry adhesive from the substrate with the relatively flat structure is about 10 to about 200 $N/cm^2$.

7. A method comprising:
- forming a multilayer thermo-reversible dry adhesive comprising:
  - forming a first layer by providing a shape memory polymer component mixture into a pan having a circular shape and curing the a shape memory polymer component mixture to form the first layer having a curved shape;
  - forming a second layer by disposing and curing a soft adhesive component mixture over the first layer;
  - wherein said first layer and second layer are joined together such that the multilayer thermo-reversible adhesive has a relatively flat structure at a first temperature and constructed and arranged to cause and to produce a memorized relatively curved structure at a second temperature without a load applied.

8. A method as set forth in claim 7 wherein the shape memory polymer component mixture comprises:
- at least one of a rigid epoxy or a flexible epoxy; and
- at least one of a crosslinking agent or a catalytic curing agent;
- wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

9. A method as set forth in claim 7 wherein the shape memory polymer component mixture comprises an aromatic diepoxy, an aliphatic diepoxy, and a diamine.

10. A method as set forth in claim 9 wherein the aromatic diepoxy is diglycidyl ether of bisphenol A epoxy monomer with an approximate epoxy equivalent weight of 180.

11. A method as set forth in claim 9 wherein the aliphatic diepoxy is neopentyl glycol diglycidyl ether.

12. A method as set forth in claim 9 wherein the diamine is polypropylene glycol)bis(2-aminopropyl) ether with an average molecular weight of 230.

13. A method as set forth in claim 7 wherein the soft adhesive component mixture comprises an aliphatic diepoxy and a diamine, and wherein the diepoxy and the diamine are present in an amount sufficient to provide, upon curing of the second layer, a soft epoxy dry adhesive layer having a glass transition temperature of $-90°$ C. to $200°$ C. and having a pull-off strength of 1-200 $N/cm^2$.

14. A method comprising:
- providing a multilayer thermo-reversible dry adhesive comprising at least one dry adhesive layer and at least one shape memory polymer layer;
- heating the multilayer thermo-reversible dry adhesive to a temperature higher than the glass transition temperature of the shape memory polymer;
- imposing a load on the multilayer thermo-reversible dry adhesive with the dry adhesive layer in contact with an underlying substrate while cooling to a temperature below the glass transition temperature of the shape memory polymer, so that the multilayer thermo-reversible dry adhesive forms a strong adhesive bond to the underlying substrate;
- heating the multilayer thermo-reversible dry adhesive to a temperature above the glass transition temperature of the shape memory polymer without an applied load; and
- wherein, upon heating, the multilayer thermo-reversible dry adhesive is constructed and arranged to cause and to produce a memorized shape to reduced adhesion to said underlying substrate.

15. A method as set forth in claim 14 wherein the load is about $1N/cm^2$ to about 20 $N/cm^2$.

16. A method as set forth in claim 14 wherein the glass transition temperature of the shape memory polymer is about 25 to about $200°$ C.

17. A method as set forth in claim 14 wherein the glass transition temperature of the dry adhesive is about $-90$ to about $200°$ C.

18. A method as set forth in claim 14 wherein the underlying substrate comprises one of stainless steel, glass, aluminum alloy 5657, polypropylene, or Teflon.

19. A product as set forth in claim 1 wherein said first shape allows said thermo-reversible dry adhesive to approach maximal contact with said counter surface at a preload of 4 $N/cm^2$ or greater, and said second shape causes substantially reduced contact with said counter surface.

20. A product as set forth in claim 1, wherein said shape memory polymer has a glass transition temperature higher than said first temperature and lower than said second temperature.

21. A product as set forth in claim 3 wherein said soft dry adhesive layer comprises an epoxy resin prepared from a mixture comprising an aliphatic diepoxy and a diamine, and the epoxy resin has a glass transition temperature between about $-90°$ C. and $25°$ C.

* * * * *